US012617082B2

(12) United States Patent
Takano et al.

(10) Patent No.: US 12,617,082 B2
(45) Date of Patent: May 5, 2026

(54) LEARNING DEVICE, LEARNING METHOD, AND RECORDING MEDIUM

(71) Applicant: NEC Corporation, Tokyo (JP)

(72) Inventors: Rin Takano, Tokyo (JP); Hiroyuki Oyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 93 days.

(21) Appl. No.: 18/278,305

(22) PCT Filed: Feb. 26, 2021

(86) PCT No.: PCT/JP2021/007341
§ 371 (c)(1),
(2) Date: Aug. 22, 2023

(87) PCT Pub. No.: WO2022/180785
PCT Pub. Date: Sep. 1, 2022

(65) Prior Publication Data
US 2024/0123614 A1 Apr. 18, 2024

(51) Int. Cl.
*B25J 9/16* (2006.01)

(52) U.S. Cl.
CPC .............. *B25J 9/163* (2013.01); *B25J 9/161* (2013.01)

(58) Field of Classification Search
CPC ... B25J 9/163; B25J 9/161; B25J 9/16; G05B 2219/39244
See application file for complete search history.

(56) References Cited

U.S. PATENT DOCUMENTS

| | | | |
|---|---|---|---|
| 8,972,056 B2* | 3/2015 | Gordon Petersen ... | B25J 9/1664 700/250 |
| 2012/0316784 A1* | 12/2012 | Chrysanthakopoulos ................... | B25J 9/1697 701/519 |
| 2018/0330200 A1 | 11/2018 | Shibata et al. | |
| 2020/0030979 A1* | 1/2020 | Bank ........................ | B25J 13/08 |
| 2020/0086480 A1 | 3/2020 | Haddadin et al. | |
| 2021/0049033 A1 | 2/2021 | Okawa et al. | |

(Continued)

FOREIGN PATENT DOCUMENTS

| | | |
|---|---|---|
| JP | 2018-190241 A | 11/2018 |
| JP | 2019-153246 A | 9/2019 |
| WO | 2018/219943 A1 | 12/2018 |

OTHER PUBLICATIONS

International Search Report for PCT Application No. PCT/JP2021/007341, mailed on Apr. 27, 2021.

(Continued)

*Primary Examiner* — Adam R Mott
*Assistant Examiner* — Sagar Kc
(74) *Attorney, Agent, or Firm* — Sughrue Mion, PLLC

(57) ABSTRACT

A learning device 1X mainly includes an optimization problem calculation means 51X and an executable state set learning means 52X. The optimization problem calculation means 51X calculates a function value to be a solution for an optimization problem which uses an evaluation function for evaluating reachability to a target state, based on an abstract system model and a detailed system model concerning a system in which a robot operates. The executable state set learning means 52X learns an executable state set of an action of the robot to be executed by a controller based on a function value.

16 Claims, 10 Drawing Sheets

100: ROBOT CONTROL SYSTEM

(56) References Cited

U.S. PATENT DOCUMENTS

| | | | | |
|---|---|---|---|---|
| 2021/0252698 A1* | 8/2021 | Paxton | .................. | G06N 3/045 |
| 2023/0330854 A1* | 10/2023 | von Drigalski | ........ | B25J 9/1661 |

OTHER PUBLICATIONS

Alkis Gotovos et al., "Active learning for level set estimation", in Int. Joint. Conf. Art. Intel., 2013.

Ilija Bogunovic et al., "Truncated variance reduction: A unified approach to Bayesian optimization and level-set estimation", In Advances in Neural Information Processing Systems (NIPS), pp. 1507-1515, 2016.

Marc Toussaint, "Logic-geometric programming: an optimization-based approach to combined task and motion planning", Proceedings of the Twenty-Fourth International Joint Conference on Artificial Intelligence (IJCAI 2015), Jul. 25, 2015, pp. 1930-1936.

* cited by examiner

100 : ROBOT CONTROL SYSTEM

1

3

15: SKILL LEARNING UNIT

FIG. 7

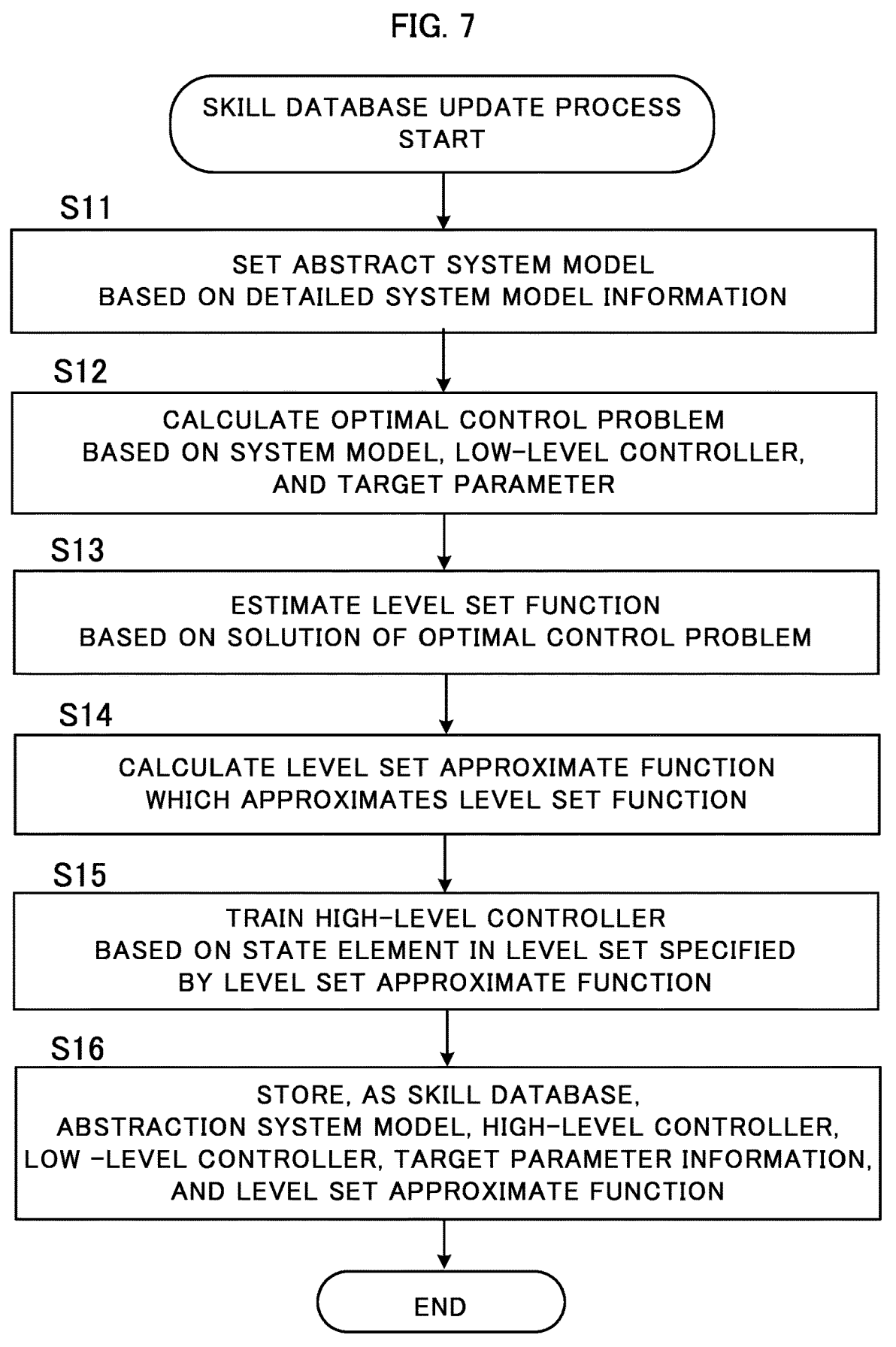

```
SKILL DATABASE UPDATE PROCESS
START
```

S11

```
SET ABSTRACT SYSTEM MODEL
BASED ON DETAILED SYSTEM MODEL INFORMATION
```

S12

```
CALCULATE OPTIMAL CONTROL PROBLEM
BASED ON SYSTEM MODEL, LOW-LEVEL CONTROLLER,
AND TARGET PARAMETER
```

S13

```
ESTIMATE LEVEL SET FUNCTION
BASED ON SOLUTION OF OPTIMAL CONTROL PROBLEM
```

S14

```
CALCULATE LEVEL SET APPROXIMATE FUNCTION
WHICH APPROXIMATES LEVEL SET FUNCTION
```

S15

```
TRAIN HIGH-LEVEL CONTROLLER
BASED ON STATE ELEMENT IN LEVEL SET SPECIFIED
BY LEVEL SET APPROXIMATE FUNCTION
```

S16

```
STORE, AS SKILL DATABASE,
ABSTRACTION SYSTEM MODEL, HIGH-LEVEL CONTROLLER,
LOW -LEVEL CONTROLLER, TARGET PARAMETER INFORMATION,
AND LEVEL SET APPROXIMATE FUNCTION
```

```
END
```

15A: SKILL LEARNING UNIT

FIG. 9

1X: LEARNING DEVICE

51X — OPTIMIZATION PROBLEM CALCULATION MEANS

52X — EXECUTABLE STATE SET LEARNING MEANS

LEARNING DEVICE, LEARNING METHOD, AND RECORDING MEDIUM

This application is a National Stage Entry of PCT/JP2021/007341 filed on Feb. 26, 2021, the contents of all of which are incorporated herein by reference, in their entirety.

TECHNICAL FIELD

The present disclosure relates to a technical field of a learning device, a learning method, and a recording medium for performing learning related to actions of a robot.

BACKGROUND ART

In a case of performing a control of a robot necessary for executing a task, a system for performing a robot control by providing a skill which modularizes an action of the robot. For example, Patent Document 1 discloses a technique in which, in a system in which an articulated robot performs a given task, a robot skill selectable according to the task is defined as a tuple, and parameters in the tuple are updated through learning. Moreover, Non Patent Document 1 discloses a level set estimation method (LSE: Level Set Estimation) which is an estimation method using a Gaussian process regression based on a Bayesian optimization concept. Furthermore, Non Patent Document 2 discloses a truncated variance reduction (TRUVAR) as another technique for estimating a level set function.

PRECEDING TECHNICAL REFERENCES

Patent Document

Patent Document 1: International Publication Pamphlet No. WO2018/219943

Non Patent Document

Non patent Document 1: A. Gotovos, N. Casati, G. Hitz, and A. Krause, "Active learning for level set estimation", in Int. Joint. Conf. Art. Intel., 2013.

Non patent Document 2: Ilija Bogunovic, Jonathan Scarlett, Andreas Krause, and Volkan Cevher, "Truncated variance reduction: A unified approach to Bayesian optimization and level-set estimation", In Advances in Neural Information Processing Systems (NIPS), pages 1507-1515, 2016.

SUMMARY

Problem to Be Solved by the Invention

In a case where actions robot are modularized as skills and an action plan of a robot using the modularized robot motions is carried out, it is necessary to acquire the skills in advance and retain in a database. In this case, it is necessary to include information concerning that in which state the system is capable of performing each skill.

It is one object of the present disclosure to provide a learning device, a learning method, and a recording medium for preferably performing learning regarding each executable state of a robot action.

Means for Solving the Problem

According to an example aspect of the present disclosure, there is provided a learning device including:

an optimization problem calculation means configured to set an optimization problem which uses an evaluation function for evaluating reachability to a target state, based on an abstract system model and a detailed system model concerning a system in which a robot operates, a controller related to the robot, and a target parameter concerning an action of the robot, and calculate the evaluation function to be a solution of the optimization problem; and an executable state set learning means configured to learn an executable state set of the action of the robot to be executed by the controller, based on the function value.

According to another example aspect of the present disclosure, there is provided a learning method performed by a computer, the learning method including:

setting an optimization problem which uses an evaluation function for evaluating reachability to a target state, based on an abstract system model and a detailed system model concerning a system in which a robot operates, a controller related to the robot, and a target parameter concerning an action of the robot;

calculating the evaluation function to be a solution of the optimization problem; and learning an executable state set of the action of the robot to be executed by the controller, based on the function value.

According to still another example aspect of the present disclosure, there is provided a learning method performed by a computer, the learning method including:

determining, for a system which state is changed by a robot which operates according to the control parameter, the control parameter from a first state to a second state by using a first model representing a relationship between a plurality of states and the control parameter; and determining a second model which evaluates an initial state which is reachable to a desired state in the system, based on the first state and the control parameter.

According to a further example aspect of the present disclosure, there is provided a recording medium storing a program, the program causing a computer to perform a process including:

setting an optimization problem which uses an evaluation function for evaluating reachability to a target state, based on an abstract system model and a detailed system model concerning a system in which a robot operates, a controller related to the robot, and a target parameter concerning an action of the robot;

calculating the evaluation function to be a solution of the optimization problem; and learning an executable state set of the action of the robot to be executed by the controller, based on the function value.

Effect of the Invention

According to the present disclosure, it is possible to preferably execute learning concerning an executable state of a robot action.

BRIEF DESCRIPTION OF THE DRAWINGS

FIG. 7 illustrates an example of a flowchart representing an update process of a skill database by the learning device.

FIG. 9 illustrates a functional configuration of a learning device in a second example embodiment.

EXAMPLE EMBODIMENTS

In the following, example embodiments of a learning device, a learning method, and a recording medium will be described with reference to the drawings. An arbitrary letter "A" followed by an arbitrary symbol "x" is denoted as "Ax" for convenience in this.

First Example Embodiment

(1) System Configuration

Figure 1:
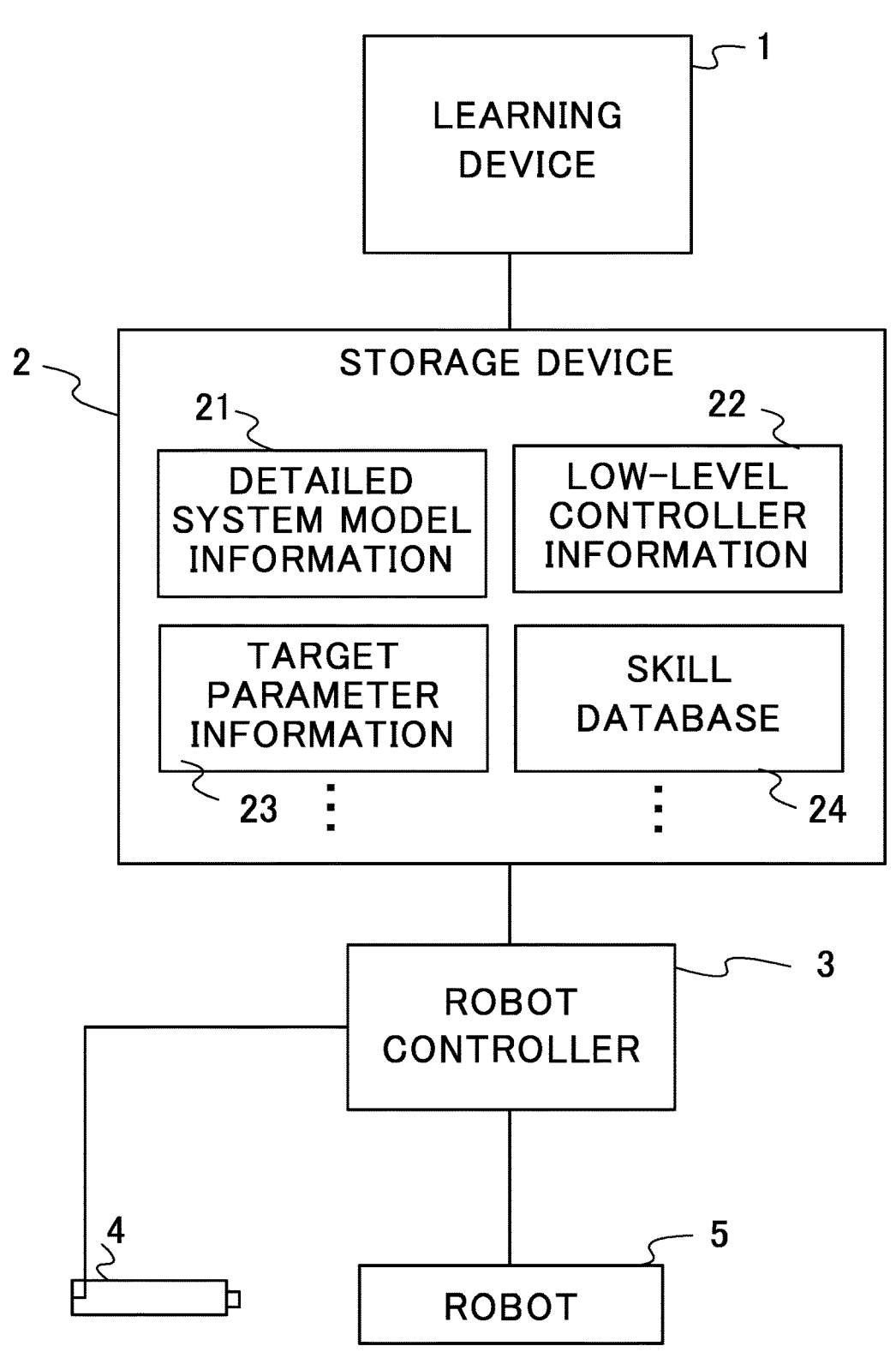
FIG. 1 illustrates a robot control system in a first example embodiment.

FIG. 1 illustrates a configuration of a robot control system 100 according to a first example embodiment. The robot control system 100 mainly includes a learning device 1, a storage device 2, a robot controller 3, a measurement device 4, and a robot 5. The learning device 1 performs data communication with the storage device 2 through a communication network or through a direct communication by wireless or wired communications. Moreover, the robot controller 3 performs data communicates with the storage device 2, the measurement device 4, and the robot 5 through the communication network or by the direct communication by the wireless or wired communications.

The learning device 1 obtains an action of the robot 5 for executing a given task by self-supervised learning and learns a state set in which the action can be executed. In this case, the learning device 1 performs the learning concerning skills in which a specific action of the robot 5 is modularized for each action (including learning of a set of states in which a skill is executable). Next, the learning device 1 registers a tuple (also referred to as a "skill tuple") of information concerning the learned skills in a skill database 24 stored in the storage device 2. The skill tuple includes various pieces of information necessary to perform an action desired to be modularized. In this case, the learning device 1 generates the skill tuple based on detailed system model information 21, low-level controller information 22, and target parameter information 23 which are stored in the storage device 2.

The storage device 2 stores information referred to by the learning device 1 and the robot controller 3. The storage device 2 stores at least the detailed system model information 21, the low-level controller information 22, the target parameter information 23, and the skill database 24. Note that the storage device 2 may be an external storage device such as a hard disk connected to or built into the learning device 1 or the robot controller 3, may be a recording medium such as a flash memory, or may be a server device for performing data communication with the learning device 1 and the robot controller 3. Moreover, the storage device 2 is formed by a plurality of storage devices, and may include various storage devices described above in a distributed manner.

The detailed system model information 21 is detailed information representing the robot 5 and a model of an operation environment (also referred to as a "detailed system model") in an actual system in which the robot 5 operates. The detailed system model information 21 may be a differential or difference equation representing the detailed system model, or may be a physical simulator.

The low-level controller information 22 is information concerning a low-level controller which generates an input for controlling the action of the actual robot 5 based on the parameters output from the high-level controller. In a case where the high-level controller generates the trajectory of the robot 5, for instance, the low-level controller may generate a control input for following the action of the robot 5 in accordance with the trajectory or perform a servo control by a PID (Proportional Integral Differential) based on the parameters output by the high-level controller.

The target parameter information 23 is information representing parameters concerning a state or a condition which is satisfied for each skill for the learning. The target parameter information 23 includes target state information representing a target state (for instance, including information concerning a stable grasping condition such as a form closure, a force closure, or the like in a case of a grasping action), execution time information concerning a limit on an execution time length (time limit), and general constraint condition information representing other general constraint conditions (for instance, conditions regarding a limit on a movable range of the robot 5, a limit on a velocity, a limit on inputs of the robot 5).

The skill database 24 is a database of skill tuples prepared for each skill. Each skill tuple includes at least information concerning the high-level controller for performing a target skill, information concerning the low-level controller for performing the target skill, and information concerning a set of executable states (executable state set) capable of performing the target skill. The executable state set is defined in an abstract space which abstracts an actual space. The executable state set can be represented, for instance, using a Gaussian process regression or an approximate function of a level set function estimated by the level set estimation method. In other words, it is possible to determine whether or not the executable state set includes a certain state, based on whether or not a value of the Gaussian process regression with respect to the certain state (that is, the average value) or a value of the approximate function for the certain state satisfies a constraint condition for determining feasibility.

After the learning process by the learning device 1, based on a measurement signal supplied by the measurement device 4, the skill database 24, and the like, the robot controller 3 formulates an action plan of the robot 5, generates a control command (control input) for causing the robot 5 to execute an action which is planned, and supplies the control command to the robot 5. In this case, the robot controller 3 converts a task to be executed by the robot 5 into a sequence for each time step (time increment) of a task acceptable for the robot 5. Next, the robot controller 3 controls the robot 5 based on the control command corresponding to an execution command of the generated sequence. The control command corresponds to the control input output by the low-level controller.

The measurement device 4 is one or a plurality of sensors corresponding cameras, range sensors, sonars, or a combination thereof for detecting a state in a workspace where the task is executed by the robot 5. The measurement device 4 supplies the generated measurement signal to the robot controller 3. The measurement device 4 may be a self-propelled or flying sensor (including a drone) which moves within the workspace. The measurement device 4 may also include a sensor provided on the robot 5, sensors provided on other objects in the workspace, and the like. The measurement device 4 may also include a sensor which detects sound in the workspace. As described above, the measurement device 4 may include a variety of sensors which detect the state in the workspace, and may include a sensor provided at any location.

The robot 5 performs each action related to the task specified in accordance with the control command supplied from the robot controller 3. The robot 5 is, for instance, a robot which operates in various factories such as an assembly factory, a food factory, and the like, at logistics sites, or the like. The robot 5 may be a vertical articulated robot, a horizontal articulated robot, or any other type of the robot. The robot 5 may supply a state signal indicating the state of the robot 5 to the robot controller 3. This state signal may be an output signal of the sensor for detecting the state (a position, an angle, and the like) of the entire robot 5 or a specific part such as a joint or the like, or may be a signal indicating a progress of the operation of the robot 5.

Note that a configuration of the robot control system 100 depicted in FIG. 1 is an example, and various changes may be made to the configuration. For instance, the robot controller 3 and the robot 5 may be integrally formed. In another example, at least any two of the learning device 1, the storage device 2, and the robot controller 3 may be integrally formed.

(2) Hardware Configuration

Figure 2A:
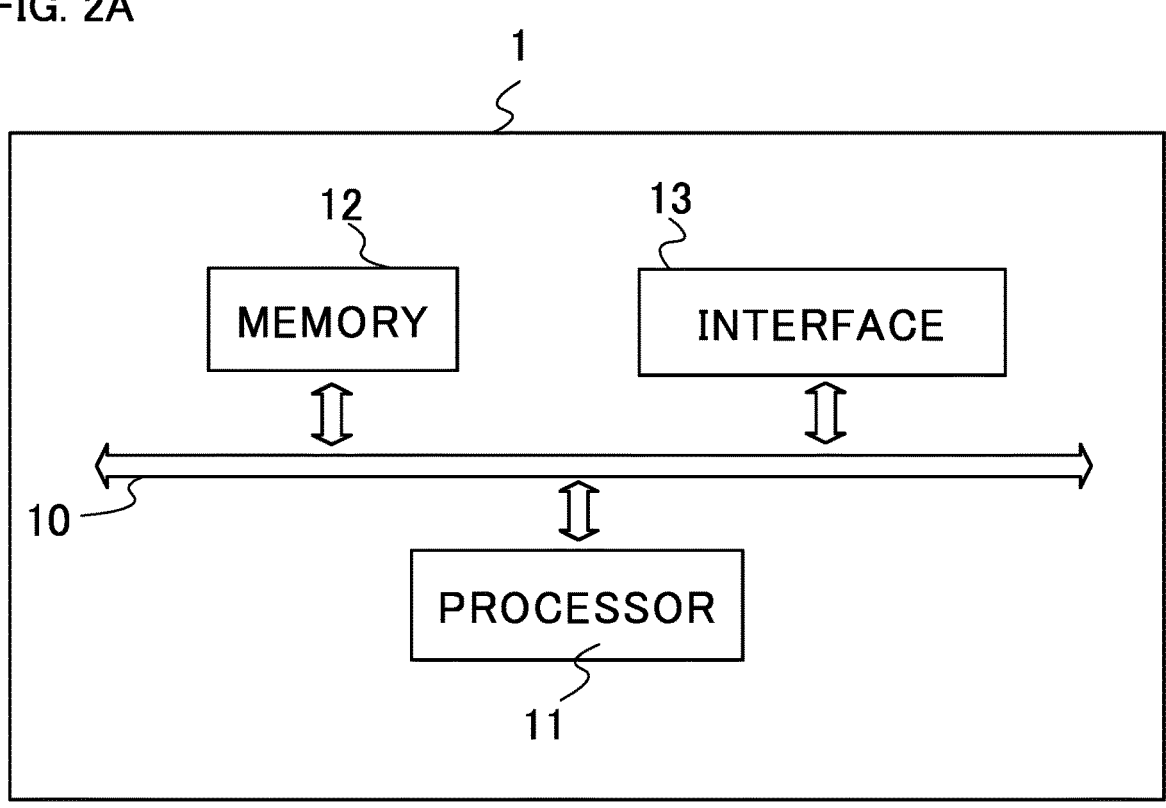
FIG. 2A illustrates a hardware configuration of a learning device.

FIG. 2A illustrates a hardware configuration of the learning device 1. The learning device 1 includes a processor 11, a memory 12, and an interface 13 as hardware. The processor 11, the memory 12, and the interface 13 are connected via a data bus 10.

The processor 11 functions as a controller (arithmetic unit) for controlling the entire learning device 1 by executing a program stored in the memory 12. The processor 11 is, for instance, a CPU (Central Processing Unit), a GPU (Graphics Processing Unit), a TPU (Tensor Processing Unit), or the like. The processor 11 may be formed by a plurality of processors. The processor 11 is an example of a computer.

The memory 12 may be formed by various volatile and nonvolatile memories such as a RAM (Random Access Memory), a ROM (Read Only Memory), and a flash memory. Moreover, a program for executing a process executed by the learning device 1 is stored in the memory 12. A part of information stored in the memory 12 may be stored by one or more external storage devices (that is, the storage device 2) which can communicate with the learning device 1, and may be stored by a recording medium which is removable to the learning device 1.

The interface 13 is an interface for electrically connecting the learning device 1 with other devices. The interface may be a wireless interface such as a network adapter for transmitting and receiving data to and from other devices wirelessly, or may be a hardware interface such as a cable for connecting to other devices. For instance, the interface 13 may perform an interface operation with an input device such as a touch panel which receives each user input (external input), a button, a keyboard, and a voice input device, a display device such as a display and a projector, and a sound output device such as a speaker, and the like.

Note that the hardware configuration of the learning device 1 is not limited to the configuration depicted in FIG. 2A. For instance, the learning device 1 may incorporate a display device, an input device, or a sound output device. The learning device 1 may be configured to include the storage device 2.

Figure 2B:
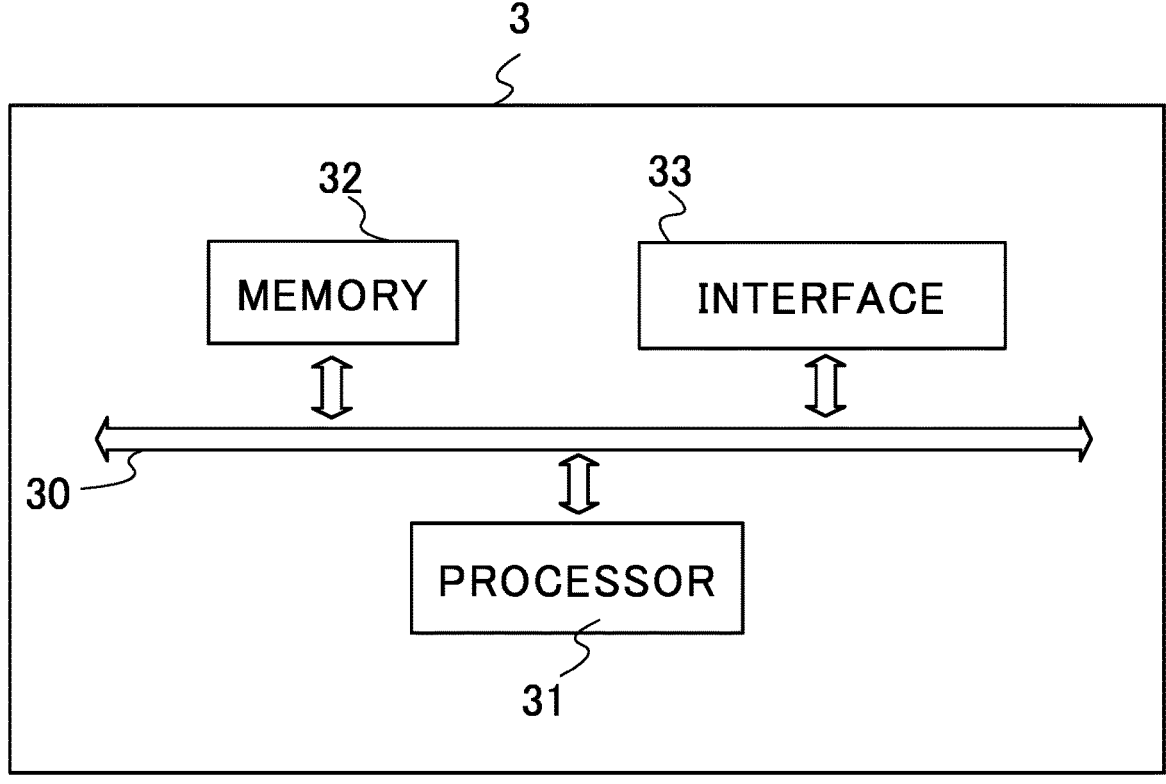
FIG. 2B illustrates a hardware configuration of a robot controller.

FIG. 2B illustrates a hardware configuration of the robot controller 3. The robot controller 3 includes a processor 31, a memory 32, and an interface 33 as hardware. The processor 31, the memory 32 and the interface 33 are connected via a data bus 30.

The processor 31 by executing a program stored in the memory 32 functions as a controller (arithmetic unit) for performing overall control of the robot controller 3. The processor 31 is, for instance, a processor such as a CPU, a GPU, a TPU. The processor 31 may form a plurality of processors.

The memory 32 may comprise a variety of volatile and non-volatile memories, such as RAM, ROM, flash memory, and the like. Moreover, in the memory 32, programs for executing processes executed by the robot controller 3 are stored. Note that a part of the information stored in the memory 32 may be stored by one or a plurality of external storage devices capable of communicating with the robot controller 3 (that is, the storage device 2), and may be stored by a recording medium which is removable to the robot controller 3.

The interface 33 is an interface for electrically connecting the robot controller 3 and other devices. These interfaces may be wireless interfaces, such as network adapters, for transmitting and receiving data to and from other devices wirelessly, or may be hardware interfaces for connecting devices, such as cables, to other devices.

Note that the hardware configuration of the robot controller 3 is not limited to the configuration depicted in FIG. 2B. For instance, the robot controller 3 may incorporate at least one of the following: a display device, an input device, or a sound output device. The robot controller 3 may be configured to include the storage device 2.

(3) Abstract Space

The robot controller 3 decides the action plan of the robot 5 in the abstract space based on the skill tuple. Therefore, the abstract space to be targeted in the action plan of the robot 5 will be described.

Figure 3A:
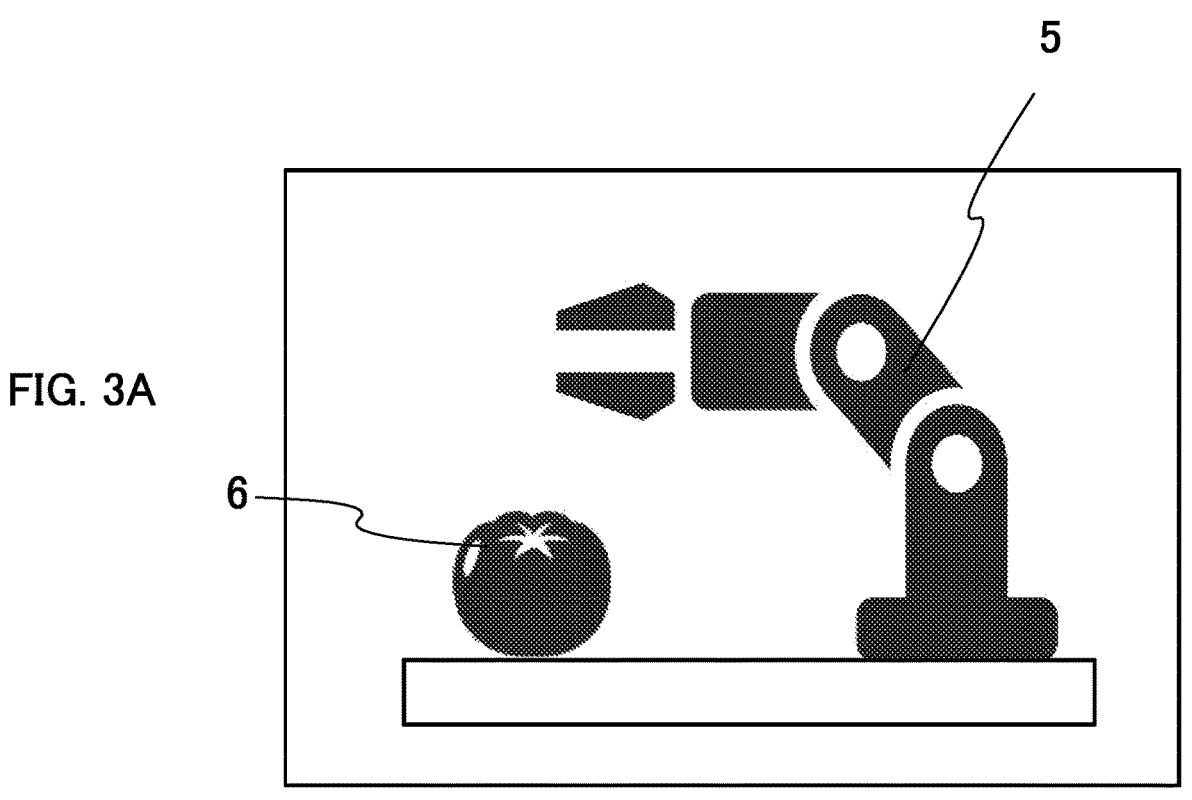
FIG. 3A is a diagram illustrating a robot (manipulator) which performs grasping an object and a grasping target object in an actual space.
Figure 3B:
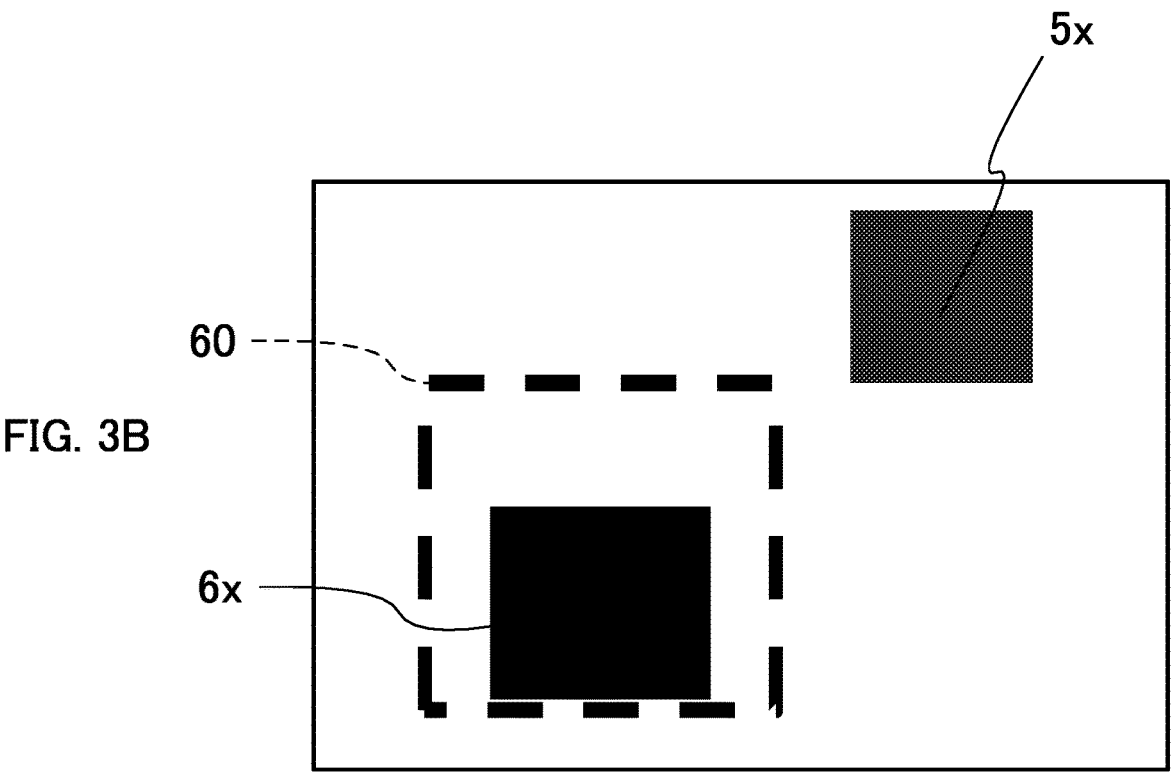
FIG. 3B is a diagram illustrating a state depicted in FIG. 3A in an abstract space.

FIG. 3A is a diagram illustrating the robot (manipulator) 5 for grasping an object and a grasping target object 6 in a real space. FIG. 3B is a diagram illustrating a state depicted in FIG. 3A in abstract space.

In general, a formulation of an action plan for the robot 5 with a task of pick-and-place requires rigorous calculations which consider a shape of the end-effector of the robot 5, a geometry of the grasping target object 6, a grasping position and a grasping posture of the robot 5, and object characteristics of the grasping target object 6 among others. On the other hand, in the present example embodiment, the robot controller 3 formulates the action plan in the abstract space in which conditions of respective objects such as the robot 5 and the grasping target object 6 are represented abstractly (in a simplified manner). In the example in FIG. 3B, in the abstract space, an abstract model 5x corresponding to the end effector of the robot 5, an abstract model 6x corresponding to the grasping target object 6, and a graspable region (see a broken-line frame 60) of the grasping target object 6 by the robot 5 are defined. Thus, a state of the robot in the abstract space abstractly (simply) represents the state of the end effector or the like. Moreover, the state of each object corresponding to an operation target object or an environmental object is also abstractly represented, for instance, in a coordinate system or the like with reference to a reference object such as a working table.

Next, the robot controller 3 in this example embodiment uses the skills to formulate the action plan in the abstract space that abstracts the actual system. Accordingly, a calculation cost necessary for the action plan is preferably suppressed even in a multi-stage task. In the example in FIG. 3B, the robot controller 3 formulates the action plan in which a skill for executing grasping is executed in the graspable region (broken-line frame 60) defined in the abstract space, and generates a control command for the robot 5 based on the formulated action plan.

Hereafter, a state of the system in a real space is denoted as "x", and a state of the system in an abstract space is denoted as "x'". The state x' is represented as a vector (abstract state vector) and includes, for instance, a vector representing the state of the operation target object (for instance, a position, an attitude, a velocity, end the like), a vector representing the state of the end effector of the robot 5 being operable, and a vector representing the state of an environmental object in a case of the task of the pick-and-place or the like. Therefore, the state x' is defined as a state vector which abstractly represents a state of a part of elements in an actual system.

(4) Control System Related to Skill Execution

Figure 4:
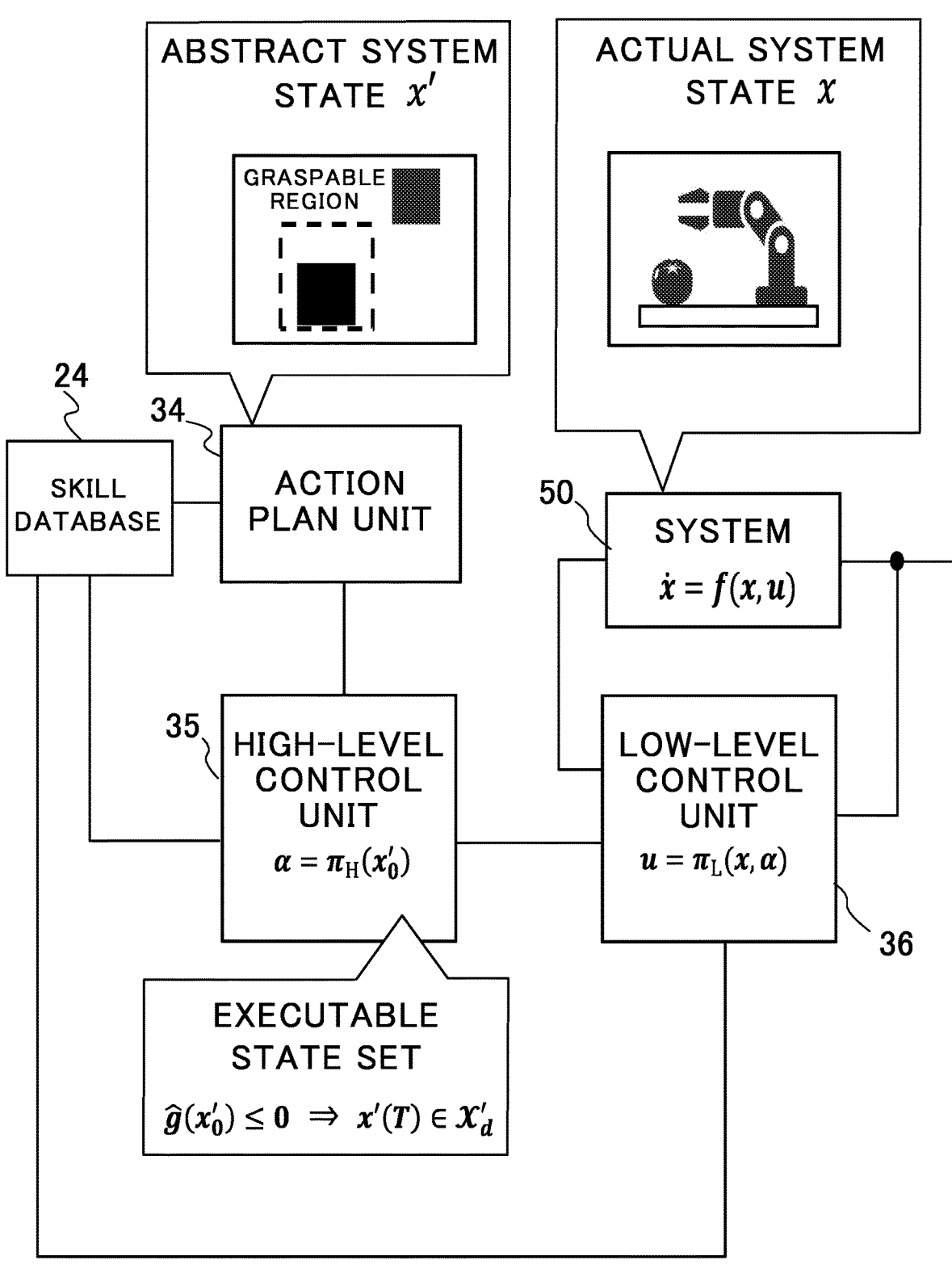
FIG. 4 is a block diagram representing a control system concerning an execution of a skill.

FIG. 4 is a block diagram illustrating a control system related to execution of skill. The processor 31 of the robot controller 3 functionally includes an action plan unit 34, a high-level control unit 35, and a low-level control unit 36. A system 50 also corresponds to an actual system. Moreover, in FIG. 4, for convenience of explanation, a balloon representing the abstract space targeted in the action plan unit 34 (see FIG. 3B) is displayed in association with the action plan unit 34, and a balloon representing a diagram illustrating the actual system corresponding to the system 50 (see FIG. 3A) is displayed in association with the system 50. Similarly, in FIG. 4, a balloon representing information concerning the executable state set of the skill is displayed in association with the high-level control unit 35.

The action plan unit 34 formulates the action plan of the robots 5 based on the state x' and the skill database 24 in the abstract system. In this case, for instance, the action plan unit 34 represents a target state by a logical expression based on a time-phase logic. In this instance, for instance, the action plan unit 34 may represent the logical expression using any time-phase logic such as a linear time-phase logic, a MTL (Metric Temporal Logic), a STL (Signal Temporal Logic), or the like. Next, the action plan unit 34 converts the generated logical expression into a sequence (action sequence) for each time step. This action sequence includes, for instance, information concerning the skill to be used in each time step.

The high-level control unit 35 recognizes the skill to be executed for each time step based on the action sequence generated by the action plan unit 34. Next, the high-level control unit 35 generates a parameter "α" as an input to the low-level control unit 36 based on the high-level controller "$\pi_H$" included in the skill tuple corresponding to the skill to be executed in a current time step. In this case, the high-level control unit 35 generates a control parameter α as depicted in the following expression (1) when a state in the abstract space at an execution start of the skill to be executed (also referred to as an "initial state") "$x_0$'" belongs to an executable state set $\chi_0$' of the skill.

$$\alpha = \pi_H(x_0') \qquad (1)$$

Also, when an approximate function of the level set function capable of determining whether or not it belongs to the executable state set $\chi_0$ of the skill is defined as "ĝ'", the robot controller 3 can determine whether or not the state $x_0$' belongs to the executable state set $\chi_0$', by determining whether or not the following expression is satisfied:

$$\hat{g}(x_0') \leq 0.$$

In other words, the condition may represent a constraint condition which determines an executability of a certain condition. Alternatively, the function "ĝ'" can be a model capable of evaluating whether or not to reach a given target state from a certain initial state $x_0$'. In this case, when the target state set, which is the set of target states in the abstract space after the execution of the target skill, is denoted by "$\chi'_d$", a time length (runtime length) necessary to execute the target skill is denoted by "T", and a state at T time elapsed from the initial state x'$_0$ is denoted by "x'(T)", x'(T)$\in\chi'_d$ can be realized by using the low-level control unit 36. The approximate function ĝ is obtained by learning of the learning device 1, as will be described later.

The low-level control unit 36 generates an input "u" based on the control parameter "α" generated by the high-level control unit 35 and the state x in the current actual system obtained from the system 50. In this instance, based on the low-level controller "$\pi_L$" included in the skill tuple, the low-level control unit 36 generates the input "u" as a control command as represented in the following expression:

$$u = \pi_L(x, \alpha).$$

Note that the low-level controller $\pi_L$ is not limited to the format of the above expression, but may be a controller having various types.

Note that the low-level control unit 36 acquires the state x as the state x for the robot 5 and an environment recognized by using any state recognition technique based on a measurement signal output by the measurement device 4 (a signal from the robot 5 may be included) or the like. In FIG. 4, the system 50 is represented by the input u to the robot 5 and the state expression "x'"=f(x, u)" using a function "f" with a state x as an argument. An operator "'" denotes a derivative with respect to time or a difference of time.

(5) Overview for Updating Skill Database

Figure 5:
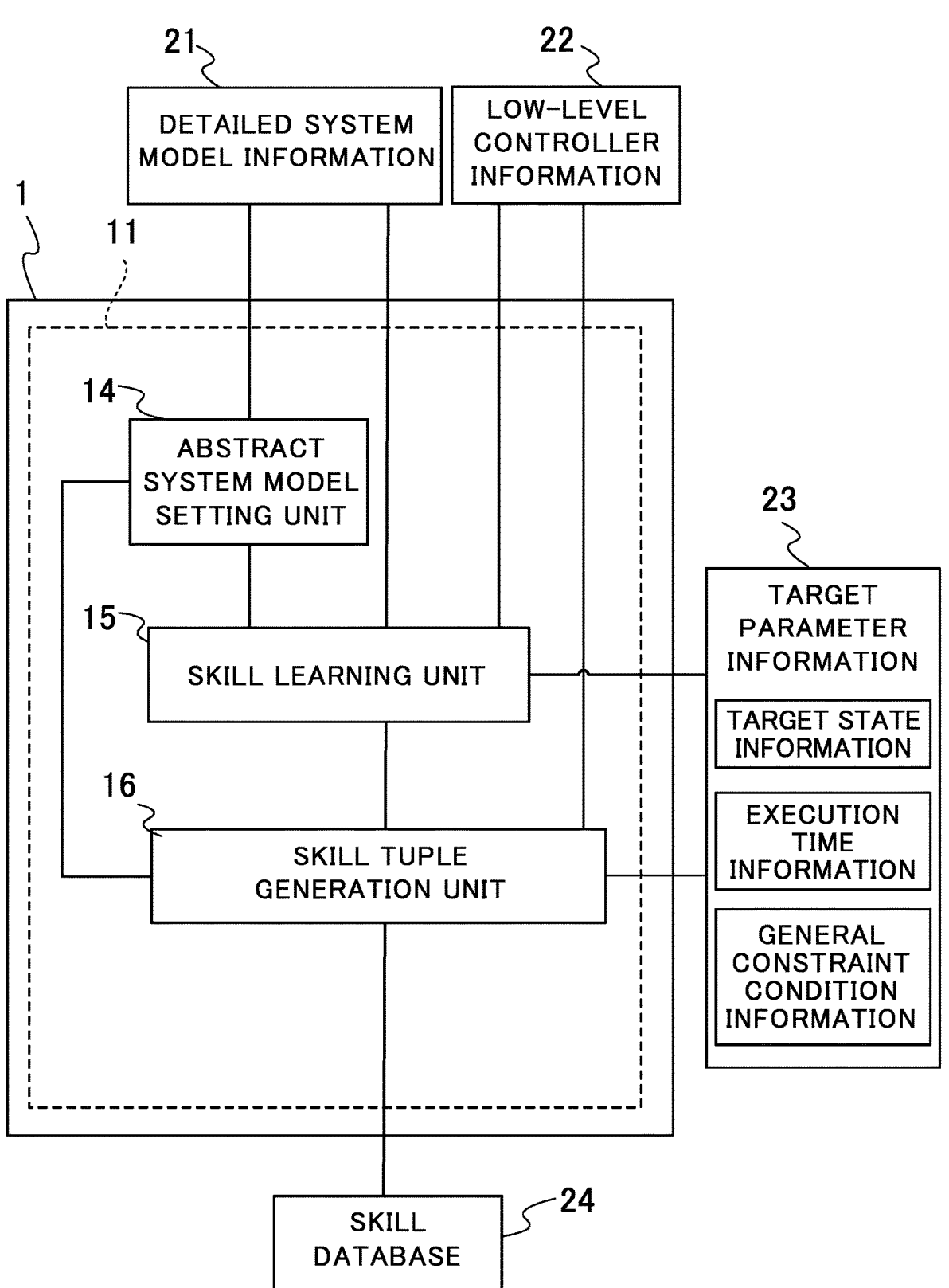
FIG. 5 illustrates an example of a functional block of the learning device concerning an update of a skill database.

FIG. 5 illustrates an example of a functional block of the learning device 1 for updating the skill database. The processor 11 of the learning device 1 functionally includes an abstract system model setting unit 14, a skill learning unit 15, and a skill tuple generation unit 16. Note that FIG. 5 illustrates an example of the data to be exchanged between respective blocks, but it is not limited to this. The same applies to the drawings of other functional blocks described below.

The abstract system model setting unit 14 sets the abstract system model based on the detailed system model information 21. This abstract system model is a simple model for the action plan having, as a state, an abstract state vector x' formed based on the state x of the detailed system model (a model corresponding to the system 50 in FIG. 4) specified by the detailed system model information 21. In this case, for instance, the abstract system model setting unit 14 calculates the abstract system model from the detailed system model based on an algorithm stored in advance in the storage device 2 or the like. Note that in a case where information related to the abstract system model is stored in advance in the storage device 2 or the like, the abstract system model setting unit 14 may acquire information related to the abstract system model from the storage device 2 or the like. The abstract system model setting unit 14 supplies the information about the set abstract system model to the skill learning unit 15 and the skill tuple generation unit 16, respectively.

The skill learning unit 15 performs learning on the skill to be generated based on the abstract system model set by the abstract system model setting unit 14, the detailed system model information 21, the low-level controller information 22, and the target parameter information 23 (including the target state information, the execution time information, and the general constraint condition information). In this case, the skill learning unit 15 performs learning of the executable state set $\chi_0$ of the skills to be executed by the low-level controller $\pi_L$, and learning of the high-level controller $\pi_H$ which outputs a value of the control parameter $\alpha$ of the low-level controller $\pi_L$ (a value which satisfies a determination condition of suitability, for instance, an optimal value) in which the state included in the learned executable state set $\chi_0'$ is used as an input. A detailed process of the skill learning unit 15 will be described later.

The skill tuple generation unit 16 generates a set (tuple) including information concerning the executable state set $\chi_0'$ learned by the skill learning unit 15, information concerning the high-level controller $\pi_H$, information concerning the abstract system model set by the abstract system model setting unit 14, the low-level controller information 22, and the target parameter information 23 as the skill tuple. Next, the skill tuple generation unit 16 registers the generated skill table in the skill database 24.

Here, each component of the abstract system model setting unit 14, the skill learning unit 15, and the skill tuple generation unit 16 can be realized, for instance, by the processor 11 executing programs. Additionally, necessary programs may be recorded on any non-volatile recording medium and installed as necessary to realize each component. Note that at least a portion of each of these components may be implemented by any combination of hardware, firmware, and software, or the like, without being limited to implementation by software based on the programs. Moreover, at least some of these components may also be implemented using user programmable integrated circuitry such as a FPGA (Field-Programmable Gate Array) or a microcontroller. In this case, the integrated circuit may be used to realize programs formed by respective components described above. At least some of the components may also be formed by an ASSP (Application Specific Standard Produce), an ASIC (Application Specific Integrated Circuit), or a quantum computer control chip. Thus, the components may be implemented by various hardware. The above is also applied to other example embodiments described later. Furthermore, each of these components may be implemented by collaborating with a plurality of computers, for instance, using cloud computing technology.

(6) Details of Skill Learning Unit

Next, details of a process executed by the skill learning unit 15 depicted in FIG. 5 will be described.

(6-1) Functional Block

Figure 6:
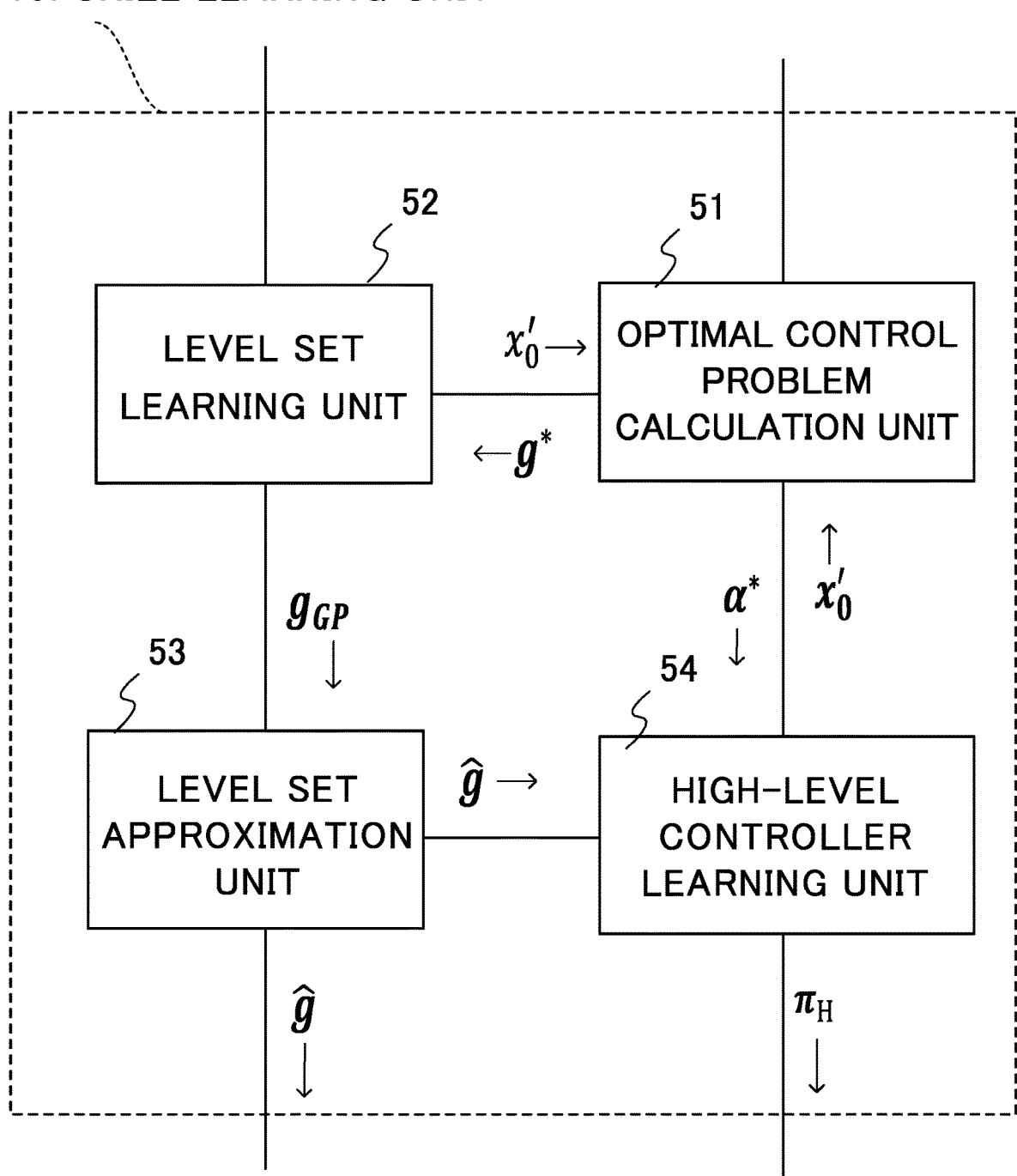
FIG. 6 illustrates an example of a functional block of a skill learning unit.

FIG. 6 is an example of a functional block of the skill learning unit 15. The skill learning unit 15 functionally includes an optimal control problem calculation unit 51, a level set learning unit 52, a level set approximation unit 53, and a high-level controller learning unit 54.

Based on the detailed system model, the abstract system model, the low-level controller, and the target parameter, the optimal control problem calculation unit 51 determines reachability to a target state set $\chi'_d$ of a solution with the initial state in abstract state as $x_0'$. In this case, when the state of the T time elapsed from the initial state $x_0'$ is denoted by "$x'(T)$" and the target state set $\chi'_d$ is given as a state set which satisfies $g(x') \leq 0$, the optimal control problem calculation unit 51 sets an optimal control problem (optimization problem) to minimize an evaluation function $g(x'(T))$. Next, the optimal control problem calculation unit 51 obtains a value of the control parameter $\alpha$ (a value which satisfies a condition for determining suitability as a solution, for instance, an optimal value, hereinafter referred to as the optimal control parameter $\alpha^*$) and a function value "$g^*$", which correspond to a solution obtained according to the optimal control problem. Subsequently, the optimal control problem calculation unit 51 determines that a transition from the initial state $x_0'$ to the target state set $\chi'_d$ is feasible when the function value $g^*$ satisfies "$g^* \leq 0$". Here, the initial state $x_0'$ is specified by the level set learning unit 52 and the high-level controller learning unit 54 as will be described later. Details of the process by the optimal control problem calculation unit 51 will be further described in a section of "(6-2) Details of Optimal Control Problem Calculation Unit".

The level set learning unit 52 learns the level set function representing the executable state set $\chi_0'$ in the abstract space of the low-level controller of the target skill. In this case, the level set learning unit 52 performs a calculation request of the optimal control problem specifying the initial state $x_0$ of the state $x'$ with respect to the optimal control problem calculation unit 51, and learns the level set function based on a plurality of pairs of the specified initial states $x_0$ and the function values $g^*$ being supplied as a response from the optimal control problem calculation unit 51. In this case, the level set learning unit 52 identifies the approximate function of the level set function as an example with a level set function "$g_{GP}$" obtained through the Gaussian process regression by using a level set estimation method. Details of process of the level set learning unit 52 will be further described in a section "(6-3) Details of the level set learning unit".

The level set approximation unit 53 determines an approximate function $\hat{g}$ (also referred to as a "level set approximate function $\hat{g}$") in which the level set function is simplified by a polynomial approximation or the like in consideration of a calculation cost of the level set function in the action plan. In this case, the level set approximation unit 53 determines the level set approximation function $\hat{g}$ so that an inner set of the level set approximation function $\hat{g}(x_0')$ in any form satisfying a next expression and an inner set "$g_{GP}(x_0') \leq 0$" of the level set function gop satisfy the following relationship.

$$g_{GP}(x_0') \geq \hat{g}(x_0') \leq 0$$

The high-level controller learning unit 54 learns a high-level controller $\pi_H$ which satisfies "$\alpha=\pi_H(x_0{}')$" (see the expression (1)) based on a plurality of pairs of initial states $x_0{}'$ belonging to the executable state set $\chi_0{}'$ specified by the approximate functions $\hat{g}$ and the optimal control parameter $\alpha^*$. Details of the process of the high-level controller learning unit 54 will be further described in a section of "(6-4) Details of the high-level controller learning unit".

(6-2) Details of Optimal Control Problem Calculation Unit

The calculation of the optimal control problem by the optimal control problem calculation unit 51 will be specifically described. The optimal control problem calculation unit 51 determines the reachability to the target state set $\chi'_d$ in the abstract state by the optimal control problem. Here, the target state set $\chi'_d$ is represented by the following expression using an evaluation function g.

$$\chi_d' = \{x' | g(x') \leq 0\} \qquad \text{[Math 1]}$$

Here, when "$x' = \gamma(x)$" (where $\gamma$ is a mapping from the state of the detailed system model to the state of the abstract system model), the target state set "$\chi_d$" in the state x of the actual system is represented by the following expression.

$$\chi_d \{x | g(\gamma(x)) \leq 0\} \qquad \text{[Math 2]}$$

Next, the optimal control problem calculation unit 51 sets a problem of whether the transition from the initial state $x_0{}'$ to the target state set $\chi'_d$ in the abstract system can be realized in the actual system as the optimal control problem. Specifically, the optimal control problem calculation unit 51 sets the optimal control problem illustrated in the following expression (2) for obtaining the control parameter $\alpha$ to minimize the evaluation function g.

[Math 3]

$$g^* = \min_{\alpha} g(\gamma(x(T))) \text{ s.t. } \dot{x} = f(x(t), \pi_i(x(t), \alpha)), \qquad (2)$$
$$x(0) = x_0, \gamma(x_0) = x_0', t \in [0, T], c(x(t), \pi_i, (x(t), \alpha)) \leq 0$$

Here, "c" denotes a function representing a constraint condition, and corresponds to a function specified based on the target parameter information 23. Moreover, T denotes an execution time length, and "x(t)" denotes the state x at a t time length elapsed from the state $x_0$ in the actual system corresponding to the initial state $x_0{}'$. Next, when the function value g*, which is obtained as a solution of the optimal control problem represented by the expression (2), satisfies "g*$\leq$0," the optimal control problem calculation unit 51 determines that the transition from the specified initial state $x_0{}'$ to the target state set $\chi'_d$ is feasible, and acquires a combination of ($x_0{}'$, $\alpha^*$, g*). The combination of ($x_0{}'$, $\alpha^*$, g*) is then used for the learning to be executed.

In other words, the problem represented in the expression (2) can be said to be a model representing a relationship between a first state ($x_0{}'$), a second state (x(T)), and the control parameter ($\alpha$). Also, the process of obtaining the function value g* can be said to be a process for determining the function value g* using the model (expression (2)) which includes a constraint condition concerning a state change. However, the solution of the model represented in the expression (2) may not be a mathematically optimal solution, but may be a value which satisfies the determination condition for determining that it is the solution.

Here, for the optimal control problem represented in the expression (2), if a function f representing the detailed system model is obtained analytically, the optimal control problem calculation unit 51 can be solved using any optimal control algorithm such as a Direct Collocation method, a differential dynamic programming (DDP: Differential Dynamic Programming). Moreover, in a case where the function f representing the detailed system model is not analytically obtained (for instance, when the physical simulator or the like is used), the optimal control problem calculation unit 51 can solve the optimal control problem represented in the expression (2) using a model free optimal control method such as a Path Integral Control. In this case, the optimal control problem calculation unit 51 obtains the control parameter $\alpha$ according to the problem for minimizing the evaluation function g based on a function c representing the constraint condition.

Here, a specific example of the target parameter information 23 and the low-level controller IL used in the expression (2) will be described when generating the skill of the grasping action in the task of the pick-and-place depicted in FIG. 3A.

In this case, the detailed model uses the physical simulator capable of acquiring information of the state x, an input u, and a contact force F which is a force to grip the grasping target object 6. In addition, the target state information of the target parameter information 23 is information concerning a stable grasping condition such as a form closure, a force closure, or the like, and is represented by the following expression.

$$g(x, F) \leq 0$$

Moreover, the execution time information of the target parameter information 23 includes information for specifying a maximum value "$T_{max}$" ($T \leq T_{max}$) of an execution time length T of the skill. In addition, the general constraint condition information of the target parameter information 23 includes information representing the following constraint expression regarding the state x, the input u, and the contact force F.

$$c(x, u, F) \leq 0$$

For instance, the constraint expression is an expression which comprehensively represents the maximum value "$F_{max}$" ($F = F_{max}$) of the contact force F, a maximum value "$x_{max}$" ($|x| \leq x_{max}$) of the movable range (or velocity), a maximum value "$u_{max}$" ($|u| \leq u_{max}$) of the input u, and the like.

Furthermore, for instance, the low-level controller $\pi_L$ corresponds to a servo controller by the PID. Here, if the state of the robot 5 is denoted by "$x_r$," and the target trajectory of the state of the robot 5 is denoted by "$x_{rd}$", the input u and the target trajectory $x_{rd}$ (here, the polynomial) are represented by the following expression.

$$u = K_p(x_r - x_{rd}(t)) + K_i \int (x_r - x_{rd}(t)) dt + K_d(\dot{x}_r - \dot{x}_{rd}(t))$$

$$x_{rd}(t) = \alpha_0 + \alpha_1 t + \alpha_2 t^2 + \alpha_3 t^3 \qquad \text{[Math 4]}$$

Therefore, the control parameter $\alpha$ to be determined by the optimal control parameter is a coefficient of the target trajectory polynomial and a gain of a PID control, and is represented as follows.

$$\alpha = [\alpha_0, \ldots, \alpha_3, K_p, K_i, K_d] \qquad \text{[Math 5]}$$

Then, in the optimal control problem, the optimum value $\alpha^*$ of such control parameter $\alpha$ is calculated.

(6-3) Details of Level Set Learning Block

Next, the learning by the level set learning unit 52 will be described. When the function outputting the solution g* of the optimal control problem corresponding to the abstract state $x_0'$ is denoted by $g*(x_0'$, the executable state set $\chi_0'$ of the target skill is defined as follows.

$$\chi_0' = \{x_0' | g*(x_0') \leq 0\} \qquad \text{[Math 6]}$$

Accordingly, the level set learning unit 52 learns the level set function representing the executable state set $\chi_0'$ of the low-level controller based on the plurality of pairs of the initial state $x_0'$ and the function values g* obtained by solving the optimal control problem for various initial conditions $x_0'$. In the present example embodiment, the level set learning unit 52 calculates the level set function $g_{GP}$ representing the process procedure for determining the executable state set $\chi_0$ using the level set estimation method which is an estimation method using the Gaussian process regression based on a concept of a Bayesian optimization. Note that the level set function $g_{GP}$ may be defined using the average function of the Gaussian process obtained through the level set estimation method, or may be defined as a combination of an average function and a variance function. The level set learning unit 52 instructs the optimal control problem calculation unit 51 to calculate the optimal control problem specifying the initial state $x_0'$, and updates the level set function based on the pairs of the specified initial states $x_0'$ and the function values g* which is the solution of the optimal control problem. Here, the level set learning unit 52 determines the initial state $x_0'$ to be specified after first randomly specifying the initial state $x_0'$ based on the Gaussian process regression. Accordingly, it is possible to efficiently learn the level set function. Details of the level set estimation method are disclosed in, for instance, Non-Patent Document 1. According to this method, it is possible to calculate suitably the approximate function of the level set function by a small number of samplings for initial state $x_0'$ due to sampling of initial state $x_0'$ which is effective for estimating the level set function.

Note that the level set function may be obtained using a TRUVAR which is an estimation method using the Gaussian process regression similar to the level set estimation method. The TRUVAR is disclosed in Non-Patent Document 2.

As described above, the level set function may be any model which evaluates an initial state reachable for a desired state. It can also be said that the parameters in the modeling are determined based on pairs of the initial states $x_0'$ and the function values g* which are solutions to the optimal control problem. Accordingly, since it is possible to evaluate the initial state reachable for a certain desired state, by determining the model, it is possible to determine the control parameter capable of reaching the desired state for the system.

Furthermore, according to the model, it is determined whether or not to be reachable from a certain state to the desired state, and the robot may be controlled to operate according to the control parameter representing an action performed in the certain state in a case of being reachable.

(6-4) Details of High-Level Controller Learning Unit

Next, the learning of the high-level controller TH by the high-level controller learning unit 54 will be described.

The high-level controller learning unit 54 trains the high-level controller TH using any learning model used in machine learning. In this case, the high-level controller learning unit 54 trains the learning model using a plurality of pairs $(x_{0i}', \alpha*_i)$ (i=1 to N) of the initial state $x_0'$ and the optimal control parameter $\alpha*$ as learning samples. In this case, the high-level controller learning unit 54 trains the learning model to output $\alpha*_i$ in response to $x_0'$ being as the input data. The learning model in this case may be any model of machine learning such as a neural network, the Gaussian process regression, or a support vector regression.

In this case, the high-level controller learning unit 54 may select the pairs of $(x_{0i}', \alpha*_i)$ to be used as the learning samples from combinations of the initial state $x_0'$ specified by the level set learning unit 52 in the learning of the level set function for the optimal control problem calculation unit 51 and the optimal control parameter $\alpha*$ which is the solution of the optimal control problem. In this case, the high-level controller learning unit 54 selects, as the learning samples, the combinations of the initial state $x_0'$ and the optimal control parameter $\alpha*$ satisfied with "$\hat{g}(x_0') \leq 0$" by using the approximate function $\hat{g}$ supplied from the level set approximation unit 53.

Moreover, the high-level controller learning unit 54 may instruct the optimal control problem calculation unit 51 to calculate the optimal control problem which specifies an initial state $x_0'$ selected from executable state set $\chi_0$ in order to increase the learning samples, and acquire the optimal control parameter $\alpha*$ which is a solution of the optimal control problem in accordance with the initial state $x_0$. Next, in this case, the high-level controller learning unit 54 adds the pairs of the specified initial state $x_0'$ being specified and the optimal control parameter $\alpha*$ acquired from and the optimal control problem calculation unit 51, and learns the high-level controller TH represented in the expression (1).

(7) Process Flow

FIG. 7 illustrates an example of a flowchart representing an update process of the skill database 24 by the learning device 1. The learning device 1 performs the process of the flowchart for each of the skills to be generated.

First, the abstract system model setting unit 14 of the learning device 1 sets the abstract system model based on the detailed system model information 21 (step S11). Next, the optimal control problem calculation unit 51 of the skill learning unit 15 sets the optimal control problem represented in the expression (2) and calculates the solution of the optimal control problem based on the detailed system model indicated by the detailed system model information 21, the abstract system model set in step S11, the low-level controller indicated by the low-level controller information 22, and the target parameter indicated by the target parameter information 23 (step S12). In this case, the optimal control problem calculation unit 51 sets optimal control problems with respect to respective initial states $x_0'$ specified by the level set learning unit 52 and the level set approximation unit 53, and calculates function values g* and optimal control parameters $\alpha*$ as the solutions of the optimal control problems.

Next, the level set learning unit 52 of the skill learning unit 15 estimates the level set function of the executable state set $\chi_0'$ of the low-level controller of the target skill based on the solutions of the optimal control problems calculated in step S12 (step S13). In this case, the level set learning unit 52 instructs the optimal control problem calculation unit 51 to calculate the optimal control problem in which the initial state $x_0'$ is specified, and calculates the level set function $g_{GP}$ by a plurality of pairs of the function values $g*$ obtained as a response and the initial state $x_0'$ being specified.

Next, the level set approximation unit 53 of the skill learning unit 15 calculates a level set approximation function $\hat{g}$ in which the level set function estimated in step S13 is approximated (step S14).

Next, the high-level controller learning unit 54 of the skill learning unit 15 learns the high-level controller $\pi_H$ based on state elements in the level set specified by the level set approximate function (step S15). In this case, the high-level controller $\pi_H$ satisfying the relationship of the expression (1) is learned based on the plurality of pairs of the initial states $x_0'$ belonging to the executable state set $\chi_0'$ identified by the approximate function $\hat{g}$ and the optimal control parameters $\alpha*$.

Next, the skill tuple generation unit 16 generates the abstract system model, the high-level controller, the low-level controller, the target parameter information, and a set of level set approximate functions as the skill tuple, and stores the generated skill tuple in the skill database 24 (step S16).

As described above, the learning device 1 preferably learns the executable state set $\chi_0'$ of the low-level controller of the target skill, and can preferably perform the learning of the high-level controller $\pi_H$ necessary to execute the target skill. Accordingly, the learning device 1 can acquire information concerning the controller of the skill execution and an executable region of the skill at the same time, and suitably construct the skill database 24 available for the action plan of the robot 5. Accordingly, the skill database 24 is preferably available for performing a task involving a complex action such as assembly and tool use.

(8) Modifications

Next, modifications of the example embodiment described above will be described. The following modifications may be applied to the above-described example embodiment in any combination.

Modification 1

The level set approximation unit 53 does not need to exist in the functional block of the skill learning unit 15 illustrated in FIG. 6.

Figure 8:
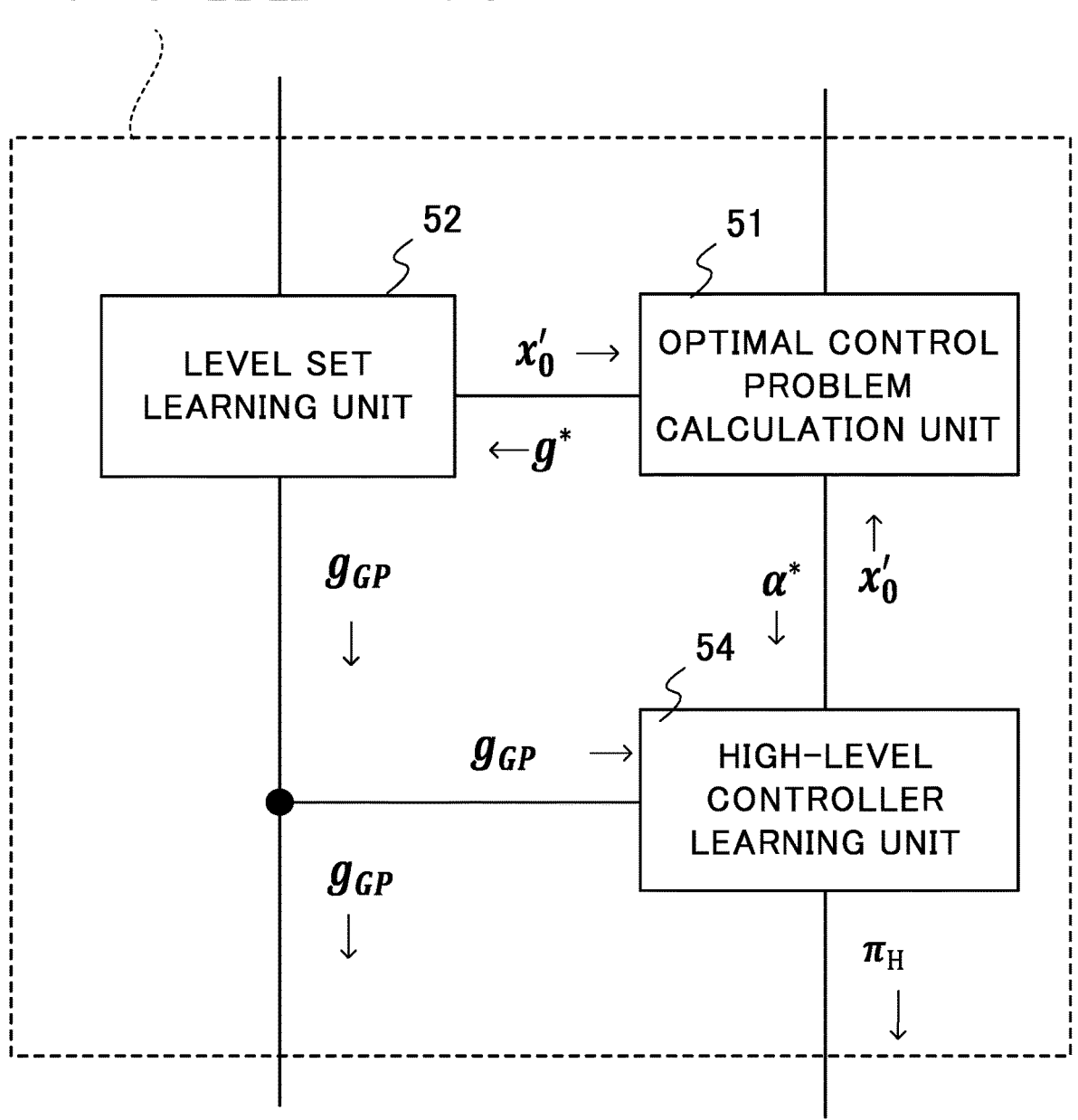
FIG. 8 illustrates an example of a functional block of the skill learning device in a modification.

FIG. 8 illustrates an example of a functional block of a skill learning unit 15A in the modification. In the example illustrated in FIG. 8, the skill learning unit 15A includes an optimal control problem calculation unit 51, a level set learning unit 52, and a high-level controller learning unit 54. The level set learning unit 52 supplies the level set function gop to the high-level controller learning unit 54, and outputs the level set function gop to the skill tuple generation unit 16 as the level set function output from the skill learning unit 15A. Next, the high-level controller learning unit 54 specifies each initial state $x_0'$ satisfying $g_{GP}(x_0') \leq 0$ as the learning sample by using the level set function gop output from level set learning unit 52, and learns the high-level controller $\pi_H$.

As described above, the learning device 1 may generate the skill tuple without calculating the approximate function $\hat{g}$ of the level set function gop learned by the level set learning unit 52.

Modification 2

The learning device 1 may calculate the function $g_{GP}$ (or $\hat{g}$) representing a process procedure for determining the executable state set $\chi_0'$ based on processes of the optimal control problem calculation unit 51 and the level set learning unit 52 (and the level set approximation unit 53) in a case where the parameters of the low-level controller are fixed. In this modification, there need not be the high-level controller defining the parameters of the low-level controller.

In this case, the optimal control problem calculation unit 51 sets an optimal control problem (optimization problem) to minimize the assessment function g based on the system model, a controller corresponding to the low-level controller, the target parameter, and the information concerning the initial state $x_0'$ specified by the level set learning unit 52, and calculates the function value $g*$ which is the solution of the set optimal control problem. Next, the level set learning unit 52 calculates the level set function gop based on the pairs of the initial states $x_0'$ and the function values $g*$. In this case, the learning device 1 can still preferably generate information concerning the executable state set $\chi_0'$, and include the generated information in the skill tuple to be registered in the skill database 24.

Second Example Embodiment

Figure 9:
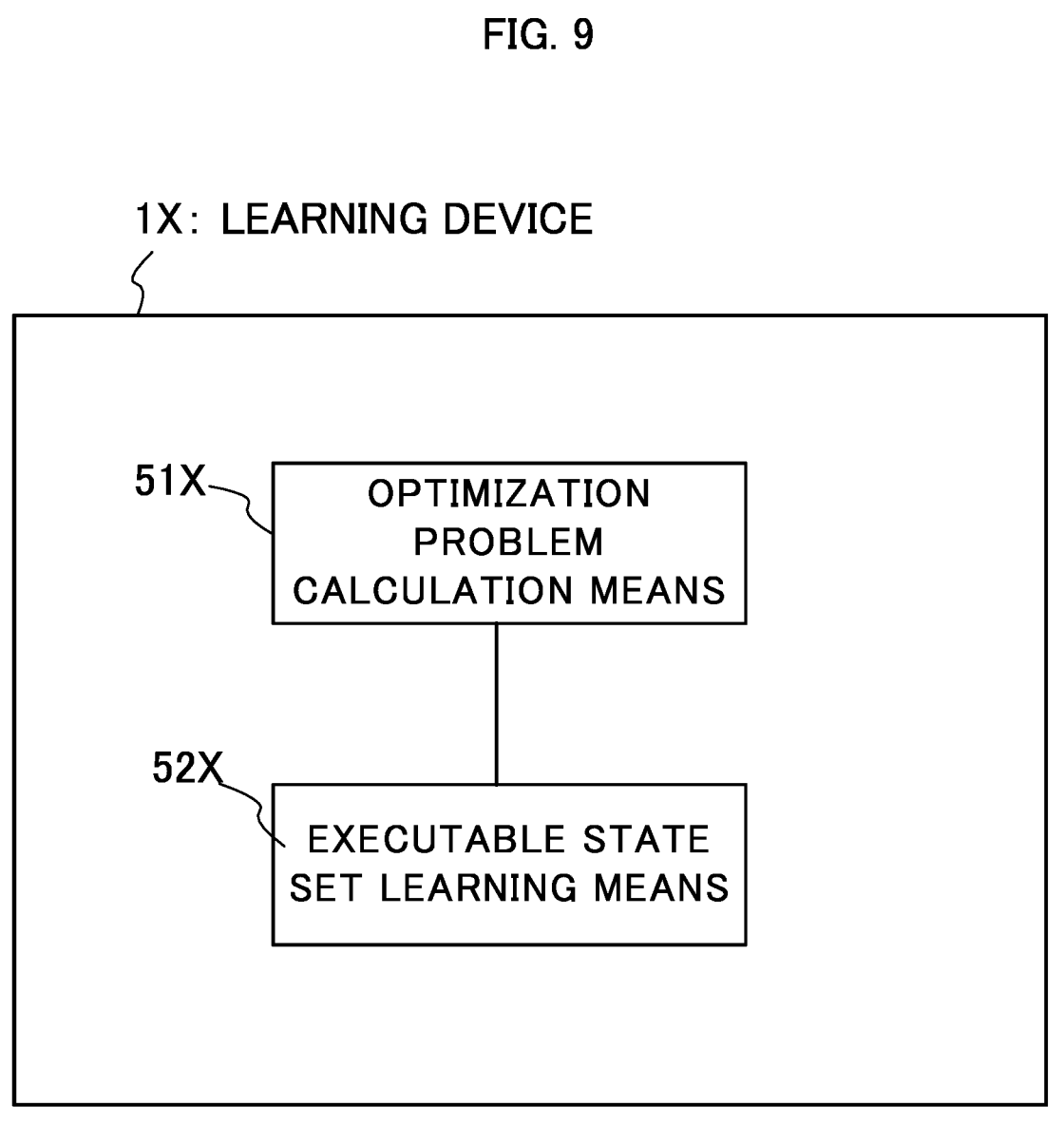

FIG. 9 illustrates a schematic configuration diagram of a learning device 1X according to a second example embodiment. The learning device 1X mainly includes an optimization problem calculation means 51X and an executable state set learning means 52X. The learning device 1X may be formed by a plurality of devices.

The optimization problem calculation means 51X sets an optimization problem which uses an evaluation function for evaluating reachability to a target state based on an abstract system model and a detailed system model which are related to a system in which a robot performs a task, a controller concerning the robot, and a target parameter concerning an action of the robot, and calculates a function value of an evaluation function to be a solution in the optimization problem. Here, for instance, the "controller" corresponds to a low-level controller in the first example embodiment (including modifications, same hereafter). Moreover, for instance, the "evaluation function for evaluating the reachability for the target state" corresponds to the evaluation function g in the first example embodiment (including modifications, same hereafter). The "function value" is, for instance, the function value $g*$ in the first example embodiment. For instance, the optimization problem calculation means 51X can be the optimal control problem calculation unit 51 in the first example embodiment.

The executable state set learning means 52X learns the executable state set of an action of the robot performed by the controller based on the function value. Here, the executable state set may be learned as a function (that is, the level set function in the first example embodiment). The executable state set learning means 52X may be, for instance, the level set learning unit 52 in the first example embodiment.

Figure 10:
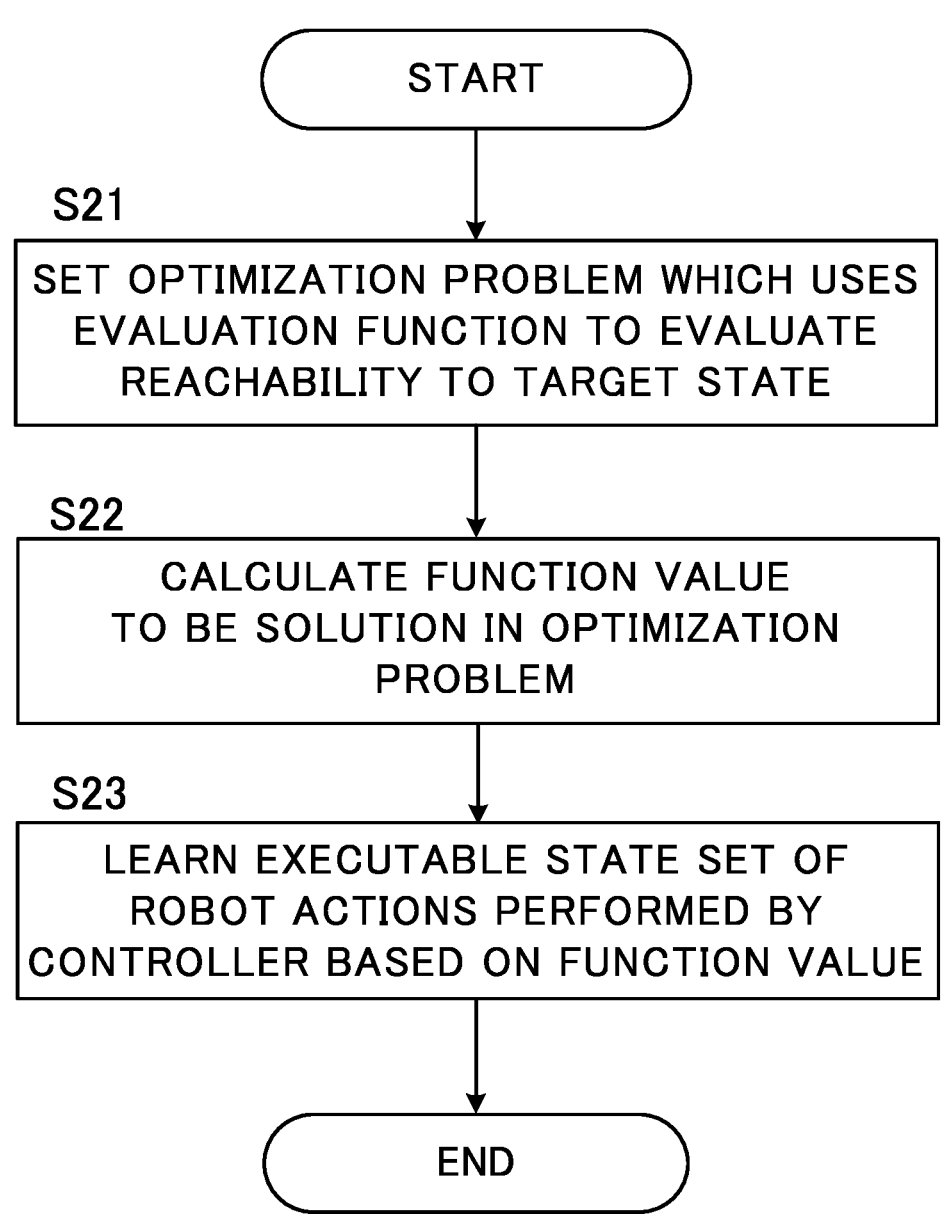
FIG. 10 illustrates an example of a flowchart executed by the learning device in the second embodiment.

FIG. 10 illustrates an example of a flowchart in the second example embodiment. The optimization problem calculation means 51X sets the optimal control problem using the evaluation function for evaluating the reachability to the target state based on the abstract system model and the detailed system model related to the system in which the robot performs the task, the controller concerning the robot, and the target parameter concerning the action of the robot (step S21). Next, the optimization problem calculation means 51X calculates the function value of the evaluation function to be the solution in the optimization problem (step S22). The executable state set learning means 52X learns the executable state set of the action of the robot executed by the controller based on the function value of the function to be the solution of the optimal control problem (step S23).

According to the second example embodiment, the learning device 1X can suitably identify the executable state set of the skill by the learning, in a case of modularizing the action of the robot performed by the controller as the skill.

In addition, a part or all of the example embodiments described above may also be described as the following supplementary notes, but not limited thereto.

Supplementary Note 1

A learning device comprising:

an optimization problem calculation means configured to set an optimization problem which uses an evaluation function for evaluating reachability to a target state, based on an abstract system model and a detailed system model concerning a system in which a robot operates, a controller related to the robot, and a target parameter concerning an action of the robot, and calculate the evaluation function to be a solution of the optimization problem; and an executable state set learning means configured to learn an executable state set of the action of the robot to be executed by the controller, based on the function value.

Supplementary Note 2

The learning device according to supplementary note 1, wherein the executable state set learning means learns a level set function representing the executable state set based on a plurality of pairs of function values and initial states set for the optimization problem.

Supplementary Note 3

The learning device according to supplementary note 2, further comprising a level set approximation means configured to calculate a level set approximation function which approximates to the level set function.

Supplementary Note 4

The learning device according to supplementary note 2 or 3, wherein the executable state set learning means specifies the initial states by sampling based on a Gaussian process regression, and perform learning of the level set function, and performs learning of the level set function based on the function values to be solutions for the optimization problem according to the specified initial states and the specified initial states.

Supplementary Note 5

The learning device according to any one of supplementary notes 1 to 4, wherein the controller includes a low-level controller which generates a control command for the robot and a high-level controller which outputs a control parameter for operating the low-level controller;

the optimization problem calculation means calculates the control parameter and the function value which are to be each solution for an optimal control problem which is set based on the abstract system model, the detailed system model, the low-level controller, and the target parameter; and the learning device further comprises a high-level controller learning means configured to learn the high-level controller based on states included in the executable state set which is learned.

Supplementary Note 6

The learning device according to supplementary note 5, wherein the high-level controller learning means learns the high-level controller based on each pair of the states included in the executable state set and each control parameter to be the solution of the optimal control problem where the states are set to respective initial states for the optimal control problem.

Supplementary Note 7

The learning device according to any one of supplementary notes 1 to 5, wherein the evaluation function is a function which evaluates the reachability with respect to a state in an abstract space, and the executable state set learning means learns the executable state set in the abstract space.

Supplementary Note 8

The learning device according to any one of supplementary notes 1 to 7, further comprising a skill tuple generation means configured to generate a skill tuple with respect to the action of the robot based on the executable state set which is learned.

Supplementary Note 9

A learning method performed by a computer, the learning method comprising:

setting an optimization problem which uses an evaluation function for evaluating reachability to a target state, based on an abstract system model and a detailed system model concerning a system in which a robot operates, a controller related to the robot, and a target parameter concerning an action of the robot;

calculating the evaluation function to be a solution of the optimization problem; and learning an executable state set of the action of the robot to be executed by the controller, based on the function value.

Supplementary Note 10

A recording medium storing a program, the program causing a computer to perform a process comprising:

setting an optimization problem which uses an evaluation function for evaluating reachability to a target state, based on an abstract system model and a detailed system model concerning a system in which a robot operates, a controller related to the robot, and a target parameter concerning an action of the robot;

calculating the evaluation function to be a solution of the optimization problem; and learning an executable state set of the action of the robot to be executed by the controller, based on the function value.

Supplementary Note 11

A learning method performed by a computer, the learning method comprising:

determining, for a system which state is changed by a robot which operates according to the control parameter, the control parameter from a first state to a second state by using a first model representing a relationship between a plurality of states and the control parameter; and determining a second model which evaluates an initial state which is reachable to a desired state in the system, based on the first state and the control parameter.

Note that the example embodiments described above, the programs can be stored using various types of non-temporary computer readable media (Non-Transitory Computer Storage Medium) and supplied to the processor or the like which is the computer. The non-transitory computer readable medium may be any of various types of tangible recording media (Tangible Storage Media). As an example, the non-transitory computer-readable medium may be a magnetic storage medium (that is, a flexible disk, a magnetic tape, or a hard disk drive), a magneto-optical storage medium (that is, a magneto-optical disk), a CD-ROM (Read Only Memory), a CD-R, a CD-R/W, a solid-state memory (that is, a mask ROM, a PROM (Programmable ROM), an EPROM (Erasable PROM), and a flash ROM, a RAM (Random Access Memory. The program may also be provided to the computer by various types of temporary computer-readable media (Transitory Computer Readable Media). In examples of temporary computer-readable media, an electrical signal, an optical signal, and an electromagnetic wave may be included. Temporary computer-readable media can provide the program to the computer over wired or wireless communication channels, such as wires, optical fibers, and the like.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS

1, 1X Learning device
2 Storage device
3 Robot controller
4 Measurement device
5 Robot
100 Robot control system

What is claimed is:

1. A learning device comprising:
a memory storing instructions; and
one or more processors configured to execute the instructions to:
  set an optimization problem which uses an evaluation function for evaluating reachability to a target state, based on an abstract system model and a detailed system model concerning a system in which a robot operates, a controller related to the robot, and a target parameter concerning an action of the robot, and calculate a function value of the evaluation function to be a solution of the optimization problem; and
  learn and control the robot based on a level set function representing an executable state set of the action of the robot to be executed by the controller, based on a plurality of pairs of function values and initial states set for the optimization problem.

2. The learning device according to claim 1, wherein the processor is further configured to calculate a level set approximation function which approximates to the level set function.

3. The learning device according to claim 1, wherein the processor specifies the initial states by sampling based on a Gaussian process regression, and performs learning of the level set function based on the function values to be solutions for the optimization problem according to the specified initial states and the specified initial states.

4. The learning device according to claim 1, wherein
the controller includes a low-level controller which generates a control command for the robot and a high-level controller which outputs a control parameter for operating the low-level controller;
the processor calculates the control parameter and the function value which are to be each solution for an optimization problem which is set based on the abstract system model, the detailed system model, the low-level controller, and the target parameter; and
the processor is further configured to learn the high-level controller based on states included in the executable state set which is learned.

5. The learning device according to claim 4, wherein the processor learns the high-level controller based on each pair of the states included in the executable state set and each control parameter to be the solution of the optimization problem where the states are set to respective ones of the initial states for the optimization problem.

6. The learning device according to claim 1, wherein
the evaluation function is a function which evaluates the reachability with respect to a state in an abstract space, and
the processor learns the executable state set in the abstract space.

7. The learning device according to claim 1, wherein the processor is further configured to generate a skill tuple with respect to the action of the robot based on the executable state set which is learned.

8. A learning method performed by a computer, the learning method comprising:
setting an optimization problem which uses an evaluation function for evaluating reachability to a target state, based on an abstract system model and a detailed system model concerning a system in which a robot operates, a controller related to the robot, and a target parameter concerning an action of the robot;
calculating a function value of the evaluation function to be a solution of the optimization problem; and
learning and controlling the robot based on a level set function representing an executable state set of the action of the robot to be executed by the controller, based on a plurality of pairs of function values and initial states set for the optimization problem.

9. A non-transitory computer-readable recording medium storing a program, the program causing a computer to perform the learning method comprising:
setting an optimization problem which uses an evaluation function for evaluating reachability to a target state, based on an abstract system model and a detailed system model concerning a system in which a robot operates, a controller related to the robot, and a target parameter concerning an action of the robot;
calculating a function value of the evaluation function to be a solution of the optimization problem; and
learning and controlling the robot based on a level set function representing an executable state set of the action of the robot to be executed by the controller, based on a plurality of pairs of function values and initial states set for the optimization problem.

10. The learning device according to claim 4, wherein the optimization problem is represented by the following equation, where g serves as the evaluation function, and a denotes the control parameter that minimizes the evaluation function:

$$g^* = \min_{\alpha} g(\gamma(x(T))) \qquad (2)$$

$$\text{s.t. } \dot{x} = f(x(t), \pi_L(x(t), \alpha)), \, x(0) = x_0,$$

$$\gamma(x_0) = x'_0, \, t \in [0, T], \, c(x(t), \pi_L(x(t), \alpha)) \leq 0$$

g denotes the evaluation function determining that a transition from a specified initial state to a target state set is feasible, in a case where "g≤0" is satisfied;

γ represents a mapping from a state of the detailed system model to a state of the abstract system model;

x(t) denotes a state x at a t time length elapsed from an initial state x0 in an actual system based on a state expression given in the above expression (2); and T denotes a runtime length of skill included in information of the target parameter information.

11. The learning device according to claim 1, wherein the one or more processors are further configured to execute the instructions to control the robot to implement the action as a physical movement of the robot in accordance with a trajectory.

12. The learning device according to claim 1, wherein the one or more processors are further configured to execute the instructions to control the robot to implement the action as a physical servo-control action which moves the robot.

13. The learning method according to claim 8, further comprising:

controlling the robot to implement the action as a physical movement of the robot in accordance with a trajectory.

14. The learning method according to claim 8, further comprising:

controlling the robot to implement the action as a physical servo-control action which moves the robot.

15. The non-transitory computer-readable recording medium according to claim 9, wherein the program further causes the computer to control the robot to implement the action as a physical movement of the robot in accordance with a trajectory.

16. The non-transitory computer-readable recording medium according to claim 9, wherein the program further causes the computer to control the robot to implement the action as a physical servo-control action which moves the robot.

* * * * *